Miles & Lane,
Wheelwrights' Machine.
N° 23,220.    Patented Mar. 8, 1859.
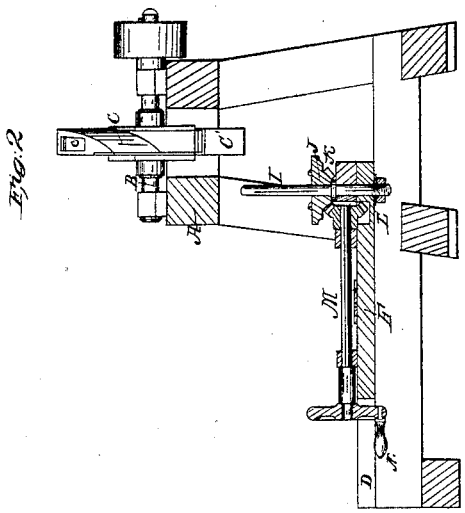
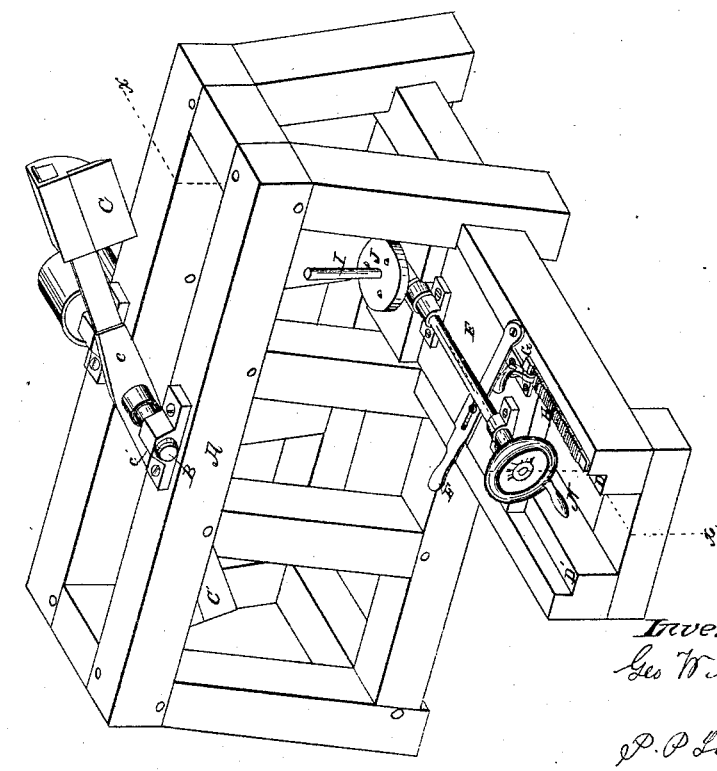
Witnesses:    Inventors:
Geo. W. Miles
P. P. Lane

UNITED STATES PATENT OFFICE.

GEO. W. MILES, OF MICHIGAN CITY, INDIANA, AND P. P. LANE, OF CINCINNATI, OHIO, ASSIGNORS TO LANE & BODLEY, OF CINCINNATI, OHIO.

MACHINE FOR HEWING OUT HUBS.

Specification of Letters Patent No. 23,220, dated March 8, 1859.

*To all whom it may concern:*

Be it known that we, GEO. W. MILES, of Michigan City, Laporte county, and State of Indiana, and PHILANDER P. LANE, of Cincinnati, Hamilton county, Ohio, have invented a new and useful Machine for Hewing Hub-Blocks; and we hereby declare the following to be a full and exact description of the same, reference being had to the accompanying drawings, making part of this specification.

The violent concussions produced in turning down hub blocks from the rough in a lathe are such as to render it difficult to secure the block firmly in the lathe and when so secured it frequently results either in straining the lathe or splitting the block. It is therefore found desirable to apply some preparatory dressing to the block before fixing it in the lathe.

The subject of the present invention is a machine for hewing or rough dressing hub blocks preparatory to turning.

In the accompanying drawings, Figure 1 is a perspective view illustrating the invention. Fig. 2, is a vertical section at $x$ $x$ Fig. 1.

A frame A, affords an elevated journal bearing to a horizontal shaft B, from whose opposite sides project two arms $c$, $c'$, whose extremities are armed with heavy axes C, C, which by the rotation of the shaft B, are caused to swing swiftly around in a vertical plane. These axes have their cutting edges somewhat oblique to the radius but coincident with the plane of rotation. A lower portion of the frame A, extending rectangularly from that which upholds the axe shaft B, has a pair of ways D, D, supporting a carriage E, which is advanced or retracted by means of a feed arm or lever F, and can be retained securely to any position by means of the pawl G, and rack H. From the forward portion of this carriage rises vertically a stationary stud shaft I, which forms the arbor of a horizontal disk J, having underneath it a bevel wheel K, which gears to a similar wheel L, at one end of a horizontal shaft M, whose other end has a crank N, placed conveniently for manipulation.

Operation: A block (center bored in the usual way) is pressed down upon the rotary disk J, its most overhanging end downward. The carriage is then advanced until the largest "practicable circle" of the block is tangential with the sweep of the axes, while the block, being slowly rotated by the crank N, is rapidly reduced to the form of a rough cylinder suitable for "chucking" in the lathe.

It will be perceived that by the above described arrangement for adjusting and holding the rest, the largest practicable cylinders may be obtained from the rough blocks, or a number of cylinders may be got out, of definite diameter.

It will be seen that the stud shaft I, although parallel to the plane is slightly oblique to the circle of rotation of the axes so that their blades make, as they descend, an increasingly shear or drawing cut which with the swiftness of their stroke prevents their edges being "drawn in" by the grain of the wood. The stud shaft being permanently fixed to the frame supports the block more firmly in position than would be the case with a rotary mandrel.

We claim as new and of our invention herein—

1. The described arrangement and combination of the axes, C, C', stud shaft I, and rotating rest J, for hewing out cylindrical forms in the manner set forth.

2. In combination with the above the ways D, D, carriage E, feed arm F, pawls G, and rack H, arranged and operating together substantially as and for the purposes explained.

In testimony of which invention we hereunto set our hands.

GEO. W. MILES.
    P. P. LANE.

Witnesses as to Geo. W. Miles:
 I. A. THORNTON,
 JAMES ORR.

Witnesses as to P. P. Lane:
 GEO. H. KNIGHT,
 J. T. BODLEY.